US008579257B2

(12) United States Patent
Taylor

(10) Patent No.: US 8,579,257 B2
(45) Date of Patent: Nov. 12, 2013

(54) VALVE ASSEMBLY WITH ANNULAR SEALING MEMBER HAVING ELONGATED-CIRCLE CROSS-SECTIONAL SHAPE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 0 days.

(21) Appl. No.: 13/186,304

(22) Filed: Jul. 19, 2011

(65) Prior Publication Data
US 2011/0272615 A1 Nov. 10, 2011

Related U.S. Application Data

(62) Division of application No. 11/757,160, filed on Jun. 1, 2007, now abandoned.

(51) Int. Cl.
*F16K 1/00* (2006.01)
(52) U.S. Cl.
USPC ........... 251/324; 251/332; 251/334; 277/651; 277/436; 277/441; 277/910
(58) Field of Classification Search
USPC .......... 251/324, 332, 333, 334; 277/650–654, 277/436, 441, 910, 601, 602, 606, 608, 638, 277/644, 584, 549, 553, 313, 314, 382, 384, 277/591, 593, 434, 437
See application file for complete search history.

(56) References Cited

U.S. PATENT DOCUMENTS

| | | | |
|---|---|---|---|
| 854,135 A | 5/1907 | Whittemore | |
| 935,387 A | 9/1909 | Mastin | |
| 1,203,762 A | 11/1916 | Mastin | |
| 1,616,088 A | 2/1927 | Kinzel | |
| 1,940,924 A | 12/1933 | Taylor | |
| 2,249,127 A | 7/1941 | Goetze | |
| 2,327,837 A | 8/1943 | Williams | |
| 2,828,238 A | 8/1958 | Batson et al. | |
| 2,898,167 A | 8/1959 | Tanner | |
| 2,940,803 A | 6/1960 | Phillips | |
| 3,603,602 A * | 9/1971 | Padula | 277/554 |
| 4,534,096 A | 8/1985 | Garcia, Jr. et al. | |
| 4,540,183 A | 9/1985 | Schneider et al. | |
| 4,755,244 A | 7/1988 | Allison | |
| 4,915,355 A | 4/1990 | Fort | |
| 5,033,756 A | 7/1991 | Sixsmith et al. | |
| 5,168,895 A | 12/1992 | Voss | |

(Continued)

*Primary Examiner* — John K Fristoe, Jr.
*Assistant Examiner* — Marina Tietjen
(74) *Attorney, Agent, or Firm* — Hall Estill Attorneys at Law

(57) ABSTRACT

Apparatus for controlling a pressurized fluid. In accordance with some embodiments, a valve assembly includes a piston moved between closed and open positions. A sealing member is disposed within an annular recess of the piston and characterized as an endless annular ring extending about a central axis of the piston. The sealing member has an elongated circle cross-sectional shape when the sealing member is in an uncompressed state prior to installation in said recess. The cross-sectional shape is defined by parallel top and bottom surfaces having a length L in a direction perpendicular to and intersecting the central axis, and having opposing inner and outer surfaces of a radius R, the inner and outer surfaces respectively facing toward and facing away from the central axis, and wherein the dimensional value of L is at least five times greater than the dimensional value of R.

21 Claims, 6 Drawing Sheets

(56) References Cited

U.S. PATENT DOCUMENTS

| | | |
|---|---|---|
| 5,407,214 A | 4/1995 | Lew et al. |
| 5,743,535 A | 4/1998 | Hodgins |
| 6,009,896 A * | 1/2000 | Van Oosten .................. 137/240 |
| 6,279,602 B1 | 8/2001 | Bonnefous et al. |
| 6,315,299 B1 | 11/2001 | Taylor |
| 6,609,895 B2 * | 8/2003 | Forthuber et al. ............... 417/22 |

* cited by examiner

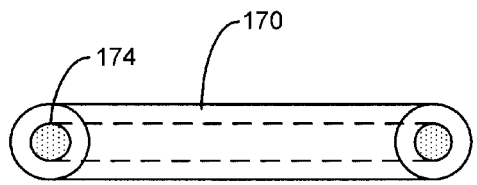
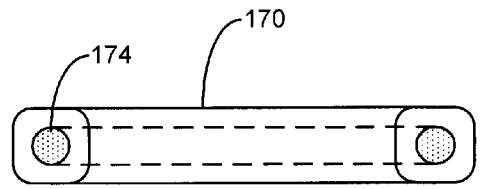
FIG. 10   FIG. 11
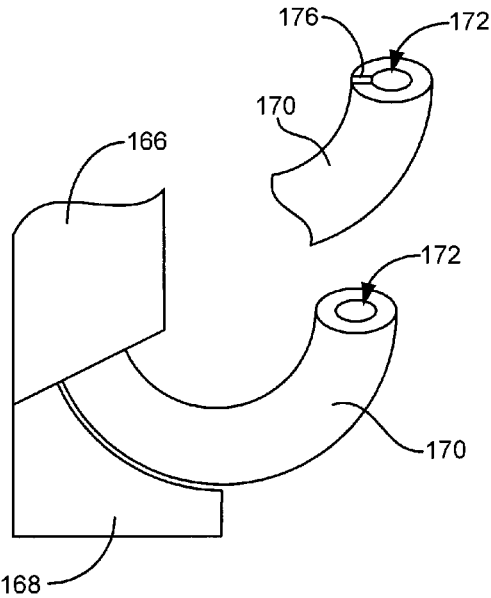
FIG. 9
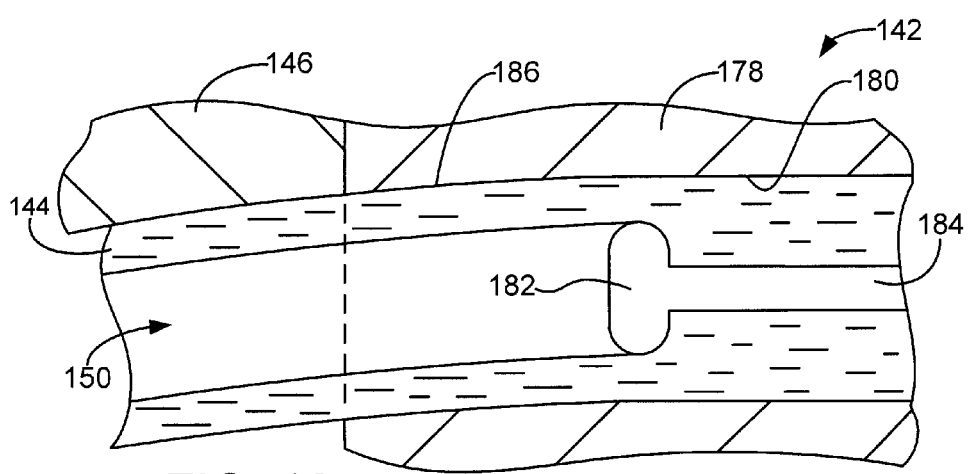
FIG. 12

VALVE ASSEMBLY WITH ANNULAR SEALING MEMBER HAVING ELONGATED-CIRCLE CROSS-SECTIONAL SHAPE

RELATED APPLICATIONS

This application is a divisional of U.S. patent application Ser. No. 11/757,160 filed Jun. 1, 2007 and now abandoned.

BACKGROUND

Sealing members are used in a variety of applications to establish fluid seals, such as in valves in a pressurized fluid system. Generally, it is desirable that a sealing member retain its sealing capability over a wide range of operational conditions. It is further generally desirable that a sealing member remain in place when subjected to significant pressurized fluid flow, such as when the sealing member is disposed on a piston member moving from a closed position to an open position.

This phenomena is illustrated in FIGS. 1A-1B, wherein is shown a prior art valve assembly 10 that includes a piston 12, the piston selectively regulating pressurized fluid flow from an inlet port 14. The piston 12 is depicted in its closed position in FIG. 1A, thereby sealing the inlet port 14. In FIG. 1B, the piston 12 is depicted as it transits from the valve closed position to the valve open position.

The fluid flow is sealed in the piston closed position (FIG. 1A) by a conventional O-ring sealing member 16 that presses against the inner wall of the port 14. The sealing member 16 has a circular cross-sectional shape, and is retained on the piston 12 within an annular recess 18. The outer radial surface of the sealing member 16 forms a fluid seal against interior annular sidewall 20 of a housing 22, and an opposing inner radial surface of the sealing member 16 forms a fluid seal against the surface of the annular recess 18.

As the piston 12 moves initially to the piston open position of FIG. 1B, significant fluid flow (arrows 24) can pass adjacent the sealing member 16. Particularly in higher pressure fluid environments, a portion of the fluid can pass between the inner radial surface of the sealing member 16 and the recess 18, exerting an outwardly (or radially) directed force on the sealing member 16. If the hoop strength (the ability to retain its initial hoop shape) of the sealing member 16 is insufficient to resist this outwardly directed force, the sealing member 16 can be deformed and dislocated (blown out) from the annular recess 18, as depicted in FIG. 1B.

SUMMARY

Accordingly, various embodiments of the present invention are generally directed to an apparatus for controlling a pressurized fluid.

In accordance with some embodiments, a valve assembly is provided in which a piston is moved from a closed position in which a pressurized fluid flow is inhibited to an open position in which a pressurized fluid flow is established. A sealing member is disposed within an annular recess of the piston and characterized as an endless annular ring extending about a central axis of the piston. The sealing member has an elongated circle cross-sectional shape when the sealing member is in an uncompressed state prior to installation in said recess, the cross-sectional shape defined by parallel top and bottom surfaces having a length L in a direction perpendicular to and intersecting the central axis, and having opposing inner and outer surfaces of a radius R, the inner and outer surfaces respectively facing toward and facing away from the central axis, and wherein the dimensional value of L is at least five times greater than the dimensional value of R.

Further advantages and features of various embodiments of the present invention will be apparent from the following description when read in conjunction with the accompanying drawings and appended claims.

BRIEF DESCRIPTION OF THE DRAWINGS

FIG. 9 shows an alternative extrusion process that provides sealing members with other cross-sectional shapes.

FIG. 10 is a cross-sectional elevational view of an alternative sealing member configuration formed by the process of FIG. 9.

FIG. 11 is a cross-sectional elevational view of another alternative sealing member formed by the process of FIG. 9.

FIG. 12 is a side elevational, cross-sectional depiction of the extrusion mechanisms generally depicted in FIGS. 7 and 9.

DETAILED DESCRIPTION

Figure 2A:
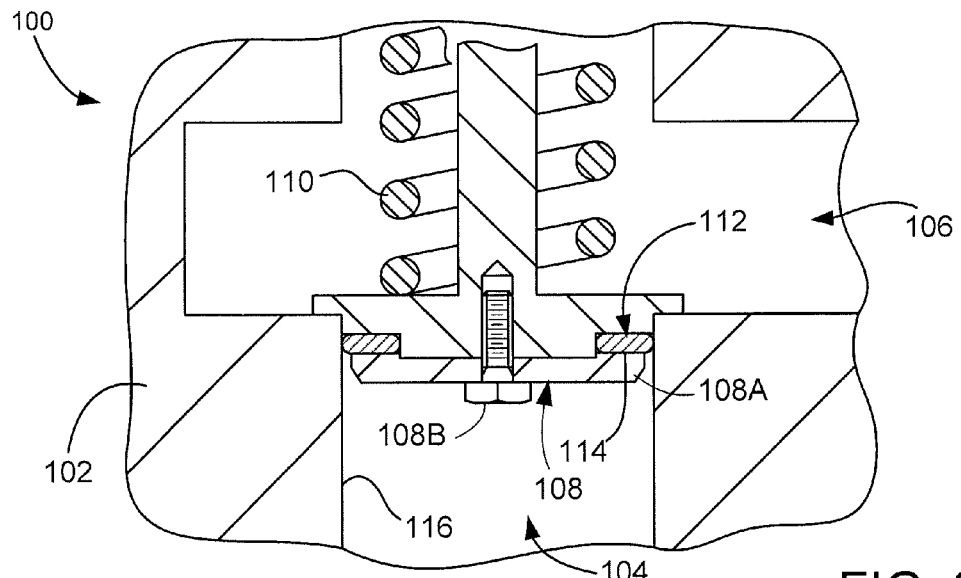
FIGS. 2A and 2B show an exemplary valve assembly incorporating a sealing member constructed in accordance with embodiments of the present invention.
Figure 2B:
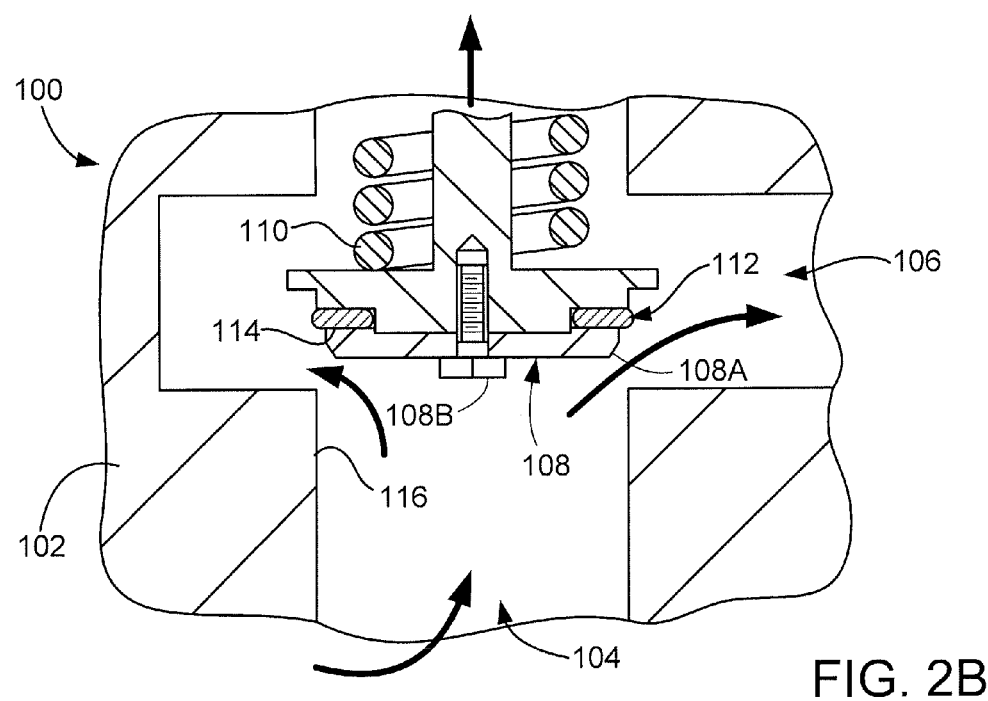

FIGS. 2A and 2B show relevant portions of a valve assembly 100 to generally illustrate an exemplary environment in which various embodiments of the present invention can be advantageously practiced. The valve assembly 100 is contemplated as being of the type configured to selectively alter the flow of a pressurized fluid in a pressurized fluid system, although such is not limiting.

The valve assembly 100 comprises a housing 102 with an upstream inlet port 104 and a downstream outlet port 106. A piston 108 selectively moves between a closed position (FIG. 2A) and an open position (FIG. 2B) to selectively inhibit or permit fluid flow of the pressurized fluid from the inlet port 104 to the outlet port 106. A biasing member 110, such as a spring, biases the piston 108 to the closed position. Other biasing arrangements can readily be used, however, or omitted entirely, as applicable for a particular application.

An annular sealing member 112 is supported in a corresponding annular groove 114 of the piston 108 by a pressure washer member 108A that is attached to the body of the piston 108 via a bolt 108B secured in a threaded bore (not separately numbered). The sealing member 112 contactingly engages the sidewall 116 of the inlet port 104 in the housing 102 to establish a fluid-tight seal while the valve assembly 100 remains in the closed position.

When the pressure of the pressurized fluid is sufficient to overcome the biasing force supplied by biasing member 110, the piston 108 advances upwardly as depicted in FIG. 2B. As the piston 108 moves to the open position, the sealing member 112 disengages the sidewall 116, and as this occurs, the sealing member 112 is subjected to the pressurized fluid as the fluid passes from the inlet port 104 to the outlet port 106. As explained more fully below, the sealing member 112 is advantageously configured to provide effective steady-state sealing in conditions such as depicted in FIG. 1, as well as to resist mechanical deformation and dislocation (blowout) while being subjected to substantial amounts of fluid flow pressure as depicted in FIG. 2.

Figure 3:
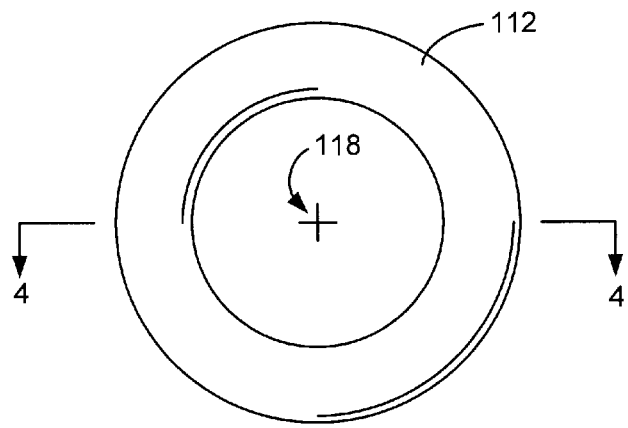
FIG. 3 is a top plan view of the sealing member of FIGS. 2A-2B.
Figure 4:
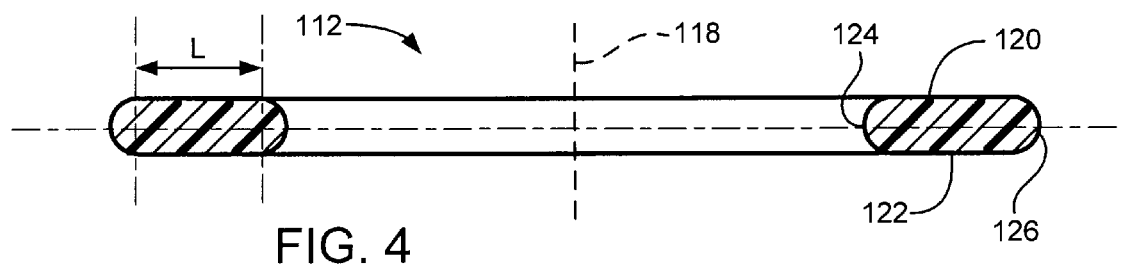
FIG. 4 is a cross-sectional representation of the sealing member along line 4-4 in FIG. 3, illustrating an exemplary elongated circle cross-sectional shape of the sealing member.

As depicted in FIGS. 3 and 4, the sealing member 112 is generally characterized as an endless annular ring, that is, an O-ring, which extends about a central axis 118. The sealing member 112 is preferably formed of an elastomeric material and has a cross-sectional shape characterized as a radially elongated circle.

Figure 5:
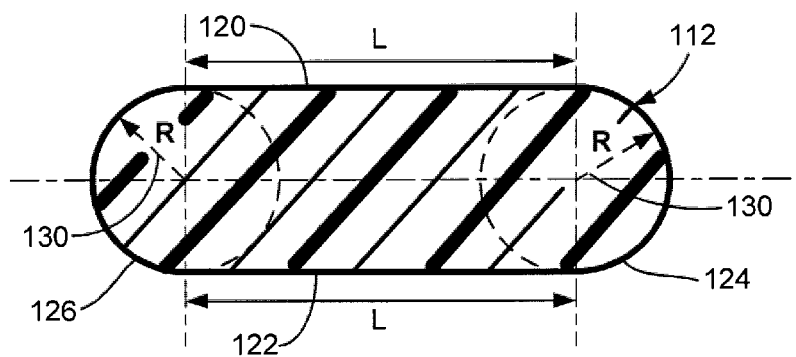
FIG. 5 is an enlarged view of a portion of FIG. 4 showing the exemplary length and radial dimensions of the elongated circle cross-sectional shape.

As further depicted in FIG. 5, the elongated circle cross-sectional shape of the sealing member 112 is generally defined by opposing, parallel top and bottom flat surfaces, that is, linear segments 120, 122, and opposing inner and outer radiused surfaces (semicircular end segments) 124, 126; that is, the inner radiused surface is numbered 124, and the outer radiused surface is numbered 126. Each of the flat surfaces 120, 122 has a length L in a direction perpendicular to, and which intersects, the central axis 118. That is, each of the flat surfaces 120, 122 lays in a plane that is normal to the central axis 118. Each of the radiused surfaces 124, 126 has a radius R that is numbered 130.

The cross-sectional shape represented in FIG. 5 is a steady-state configuration for the sealing member 112; that is, the sealing member 112 maintains the elongated circle cross-sectional shape while in an uncompressed state (i.e., in the absence of any externally applied support or compression force acting upon the member). For purposes of clarity, it will be noted that the cross-sections of FIGS. 4 and 5 are taken along a plane that includes the central axis 118 of the sealing member 112.

The dimensional values of L and R can vary depending on the requirements of a given application, with the dimensional value of the length L being greater than the dimensional value of the radius R; that is, L>R. Preferably, the dimensional value of the length L is greater than five times the dimensional value of the radius R, that is, L>5·R. As noted, the flat surfaces 120, 122 lay along respective planes normal to the central axis 118, and the radiused surfaces 124, 126 are disposed to compressingly engage corresponding sidewalls to effect fluid sealing at the innermost diameter (ID) and outermost diameter (OD) extents of the sealing member 112, that is, respectively, the inner radiused surface 124 and the outer radiused surface 126. Exemplary values for the radiuses R for different industry standard classes of circular cross-sectional shaped O-rings are set forth in Table 1:

TABLE 1

| Class | Radius R (inches) |
|---|---|
| 2-0 | 0.0350 |
| 2-1 | 0.0515 |
| 2-2 | 0.0695 |
| 2-3 | 0.1050 |
| 2-4 | 0.1375 |

The sealing member 112 can be adapted to have inner and outer radii R that correspond to any of the above classes, and used in an associated application provided that the corresponding retention groove (e.g., 114 in FIGS. 2A-2B) is extended (deepened) by a sufficient distance to accommodate the length dimension L of the sealing member 112. It will be noted that the multiple-piece configuration (pressure washer 108A, bolt 108B and body portion) is preferably set forth for the piston 108 in FIGS. 2A-2B to facilitate installation of the sealing member 112.

The sealing member 112 of FIGS. 2-4 is contemplated as comprising an equivalent class 2-3 member, with R being nominally 0.1050 inches, in (±0.0060 in). The corresponding length value L of the sealing member 112 is nominally 0.5400 in (±0.0060 in). The OD of the sealing member 112 is nominally 3.2700 in (±0.0200 in), and the ID is nominally 1.9800 in (±0.0160 in). The same L and R values can be used with different respective ID and OD values, and vice versa, as desired.

Figure 1A:
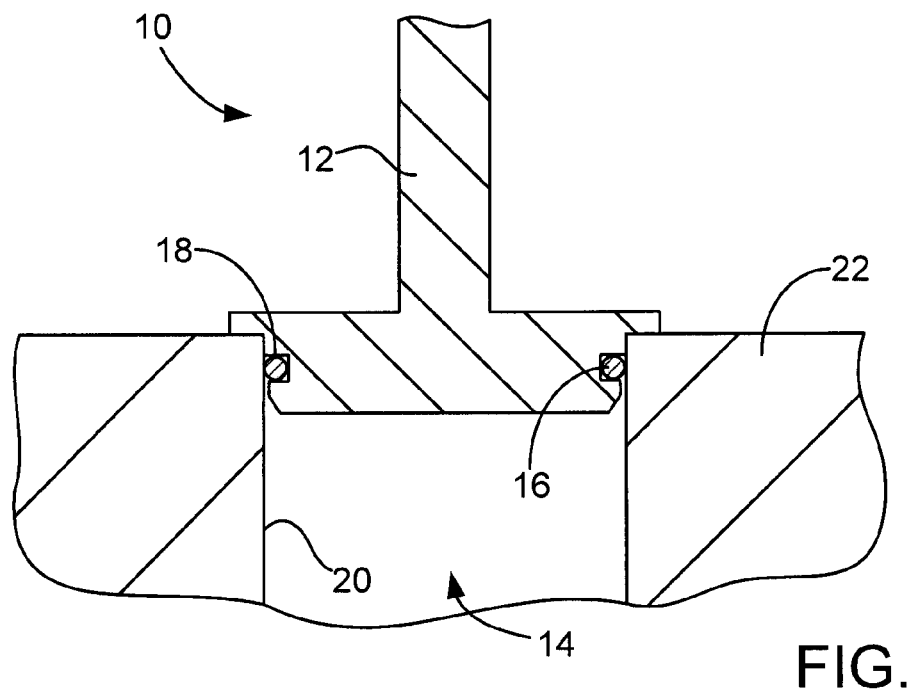
FIGS. 1A and 1B generally illustrate a prior art valve assembly in which a conventional O-ring having a circular cross-sectional shape provides a fluid seal.
Figure 1B:
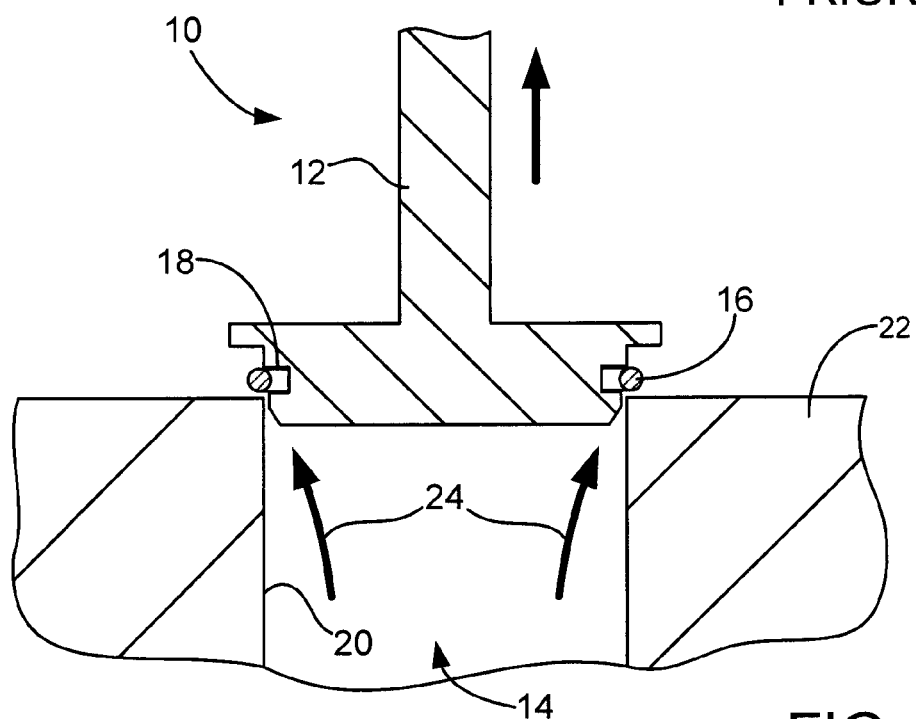

The elongated circle cross-sectional shape has been found by the present inventor to provide unexpected operational improvements over conventional configurations, such as the conventional circular O-ring depicted in FIGS. 1A-1B. The elongated circle cross-sectional shape of the sealing member of the present invention significantly enhances the hoop strength of the sealing member 112, and the length dimension L reduces the exposure of the inner radiused surface 124 to fluid pressure, that is, to pressured exerted behind the sealing member 112 within the annular groove 114 when the sealing member 112 is initially exposed to high pressure fluid as when the valve assembly 100 actuates to move from the closed position of FIG. 2A to the open position of FIG. 2B.

With the hoop strength of the sealing member 112 retaining the sealing member appropriately seated in the annular groove 114, the sealing member 112 is maintains a fluid-tight fluid seal in the captured sealing environment of FIG. 2A, provides low-frictional sliding contact against the annular wall 116, and resists damage or dislocation of the sealing member 112 in the high pressure environment of FIG. 2B.

A suitable material from which the sealing member 112 can be advantageously formed is a fluoroelastomer such as is commercially available under the registered trademark Viton® by E. I. du Pont de Nemours & Company, Wilmington, Del., USA. Other suitable materials can include any number of natural or synthetic rubbers, urethanes, plastics, etc. A suitable durometer (hardness) of the sealing member 112 may be in the order of 70-80, depending on the requirements of a given application, although both harder and softer materials can be used as desired.

Figure 6:
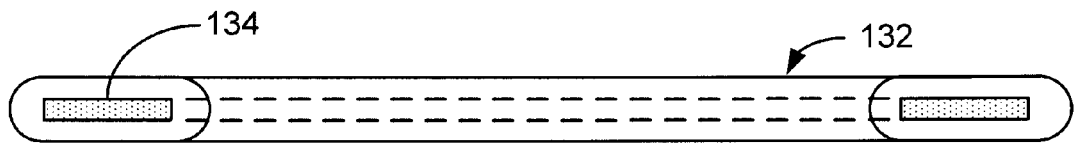
FIG. 6 illustrates an alternative construction for the sealing member which utilizes an embedded stiffening material.

Further, the seal member 112 can be stiffened with a suitable filler such as glass fibers, carbon filaments, nanotubes, etc., such as depicted in FIG. 6 in which an alternative sealing member 132 retains the afore described elongated circle cross-sectional shape of the sealing member 112, but additionally incorporates an internal stiffening core 134. The core 134 generally serves to further strengthen the sealing member 132 against damage or removal during operation, that is, to enable the sealing member 132 to resist removal from the groove 114 upon application of compressive and pressure forces.

The sealing members 112, 132 can be formed in a number of ways. Taylor U.S. Pat. No. 6,315,299, assigned to the assignee of the present invention, generally discloses a compression molding process whereby a reinforcing member is placed into an annular molding cavity. Sealing material is injected into the cavity, such as a suitable elastomer, and the combination is cured to form a reinforced sealing member. While generally operable, one difficulty associated with molding processes, such as that taught by the '299 patent process is consistently maintaining a ring member in a centrally disposed orientation. Injected material often deflects the ring and pushes it to one side of the annular cavity, resulting in non-uniform thicknesses of elastomeric material.

Figure 7:
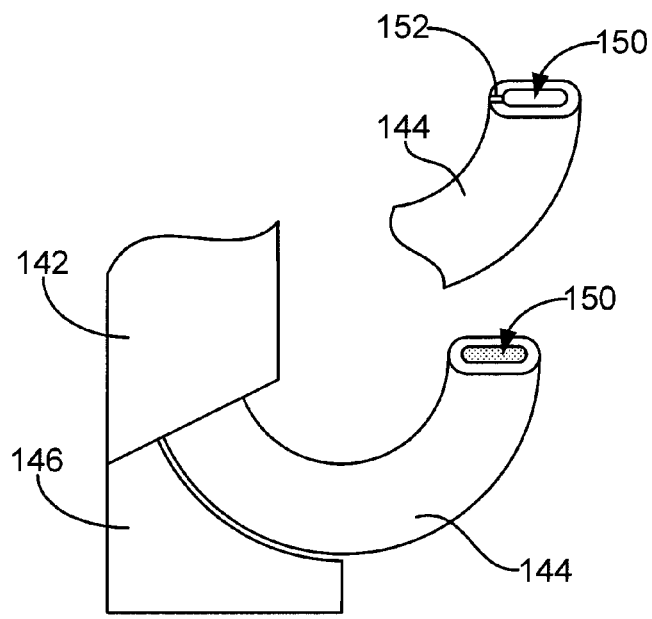
FIG. 7 illustrates a preferred manner in which the elastomeric material of the sealing member is extruded.

The various embodiments presented herein are preferably formed using an extrusion process, such as set forth in FIG. 7. An extrusion mechanism 142 extrudes uncured seal material 144 so that the extruded material remains in a soft, malleable state. A guide 146 at the exit portion of the mechanism 142 preferably induces a desired amount of curvilinearity to the extruded material 144 along a longitudinal length of the extruded material exiting the mechanism 142 to provide a substantially circular shape.

Figure 8:
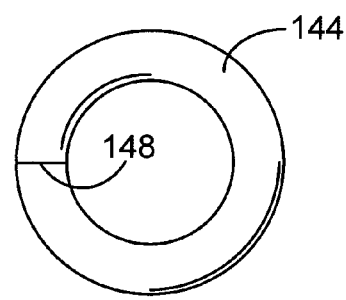
FIG. 8 shows a top plan view of the extruded material after processing in accordance with FIG. 7.

As depicted in FIG. 8, this advantageously forms an orthogonal mating seam 148 between the leading and trailing edges of the extruded material 144; that is, the leading and trailing edges nominally align at the junction or seam 148, ensuring substantially uniform thickness and eliminating voids or other discontinuities in the sealing material. It is contemplated that the seam 148 can remain visible in the sealing member at the conclusion of the subsequent curing process without affecting the operation thereof, and will enhance the hoop strength at the seam by facilitating improved joining of the leading and trailing edges. The extruded material 144 is thereafter cured in a suitable curing operation to form the sealing member.

When internal stiffening material is to be incorporated into the sealing member, the extruded material 144 can be formed hollow; that is, as shown in FIG. 7, a central channel or interior cavity 150 extends through the extruded material 144 as it exits the extrusion mechanism 142. A slit can be subsequently formed in the extruded material 144 along the internal cavity to facilitate placement of the stiffening material 134 therein.

Alternatively, as depicted in FIG. 7, an extruded slit 152 can be formed in the extruded material 144 during the extrusion process, facilitating subsequent insertion of the stiffening material 134. In either case, the extruded material 144 is thereafter cured in a suitable curing operation to form the sealing member.

While various embodiments presented above provide a sealing member with enhanced hoop strength in conjunction with the provision of an elongated circle cross-sectional shape, other embodiments disclosed herein are provided with alternative cross-sectional shapes. FIG. 9, illustrating an alternative extrusion process similar to that set forth in FIG. 7, depicts the use of an extrusion mechanism 166 and guide 168 to provide curvilinearly extending, uncured extruded material 170 that mates at an orthogonal seam, like the seam 148 of FIG. 8. However, the extruded material 170 as shown in FIGS. 9 and 10 is provided with a substantially circular cross-sectional shape, unlike the elongated circle shape formed in FIG. 7.

An interior cavity 172 is formed to extend the length of the material 170 to accommodate the placement of a suitable internal stiffening material 174, and the formation of the interior cavity 172 during the extrusion process substantially ensures that the extruded material 170 will have a uniform thickness.

As desired, a slit 176 can be cut at the internal diameter (ID) of the material 170 to facilitate placement of the stiffening material, or an extruded slit 178 can be formed during the extrusion process. Because the extrusion process precisely locates the centrally disposed cavity 172, the cross-sectional shape of the material 170 can be varied as desired, such as that of an exemplary rounded rectangle cross-sectional shape as depicted in FIG. 11.

Figure 13:
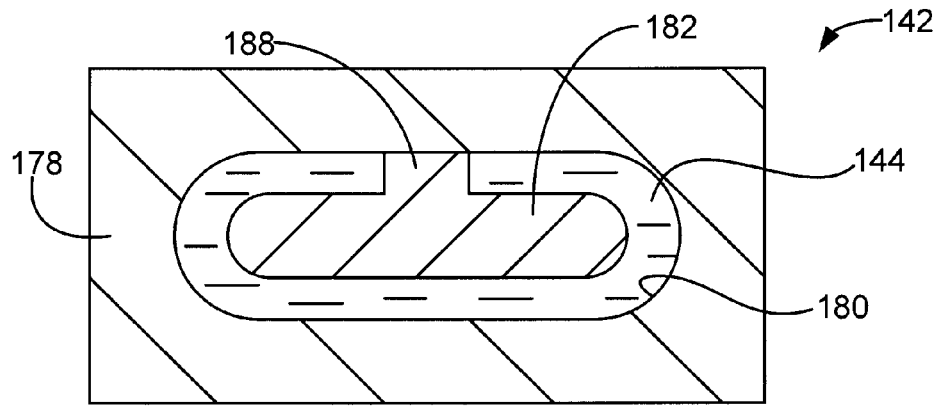
FIG. 13 is an end elevational, cross-sectional depiction of the extrusion mechanism of FIG. 12.

FIGS. 12 and 13 further illustrate preferred aspects of the various extrusion processes disclosed herein. For clarity, FIGS. 12 and 13 are illustrated with respect to the extrusion process of FIG. 7, although it will be understood that these figures can readily be adapted to the process of FIG. 9.

In FIG. 12, a housing 180 defines an interior sidewall 180 with a shape nominally conforming to the desired cross-sectional shape of the extruded material (144 in FIG. 7). A cantilevered, centrally disposed barrier 182 is supported by a support arm 184 to form the interior cavity 150 in the extruded material. As desired, the interior sidewall 180 can include a curvilinearly shaped exit portion 186 to initiate the desired curvilinearity along the longitudinal length of the extruded material 144, with or without the further use of the external guide 146.

FIG. 13 generally provides an end view of the arrangement of FIG. 12. A diverting flange 188 extends from the barrier portion 182 in a direction substantially orthogonal to the support arm 184 (FIG. 12). The flange 188 further interrupts the flow of the extruded material 144 to form the aforementioned slit 152 (FIG. 7).

Figure 14:
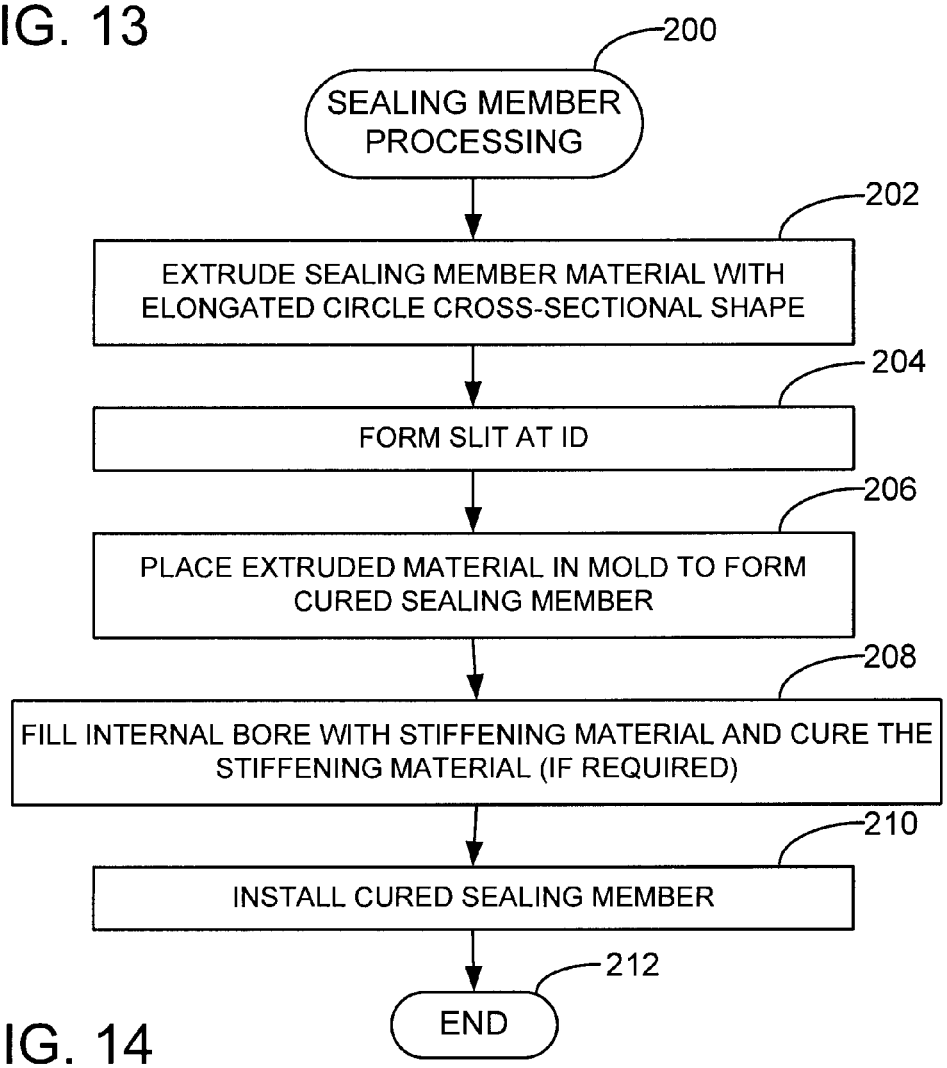
FIG. 14 provides a flow chart for an exemplary sealing member processing routine, generally illustrative of steps carried out in accordance with various embodiments of the present invention.

FIG. 14 provides a flow chart for a sealing member processing routine 200, generally illustrative of preferred steps carried out in accordance with the foregoing discussion.

At extruding step 202, a suitable sealing material is initially extruded from a suitable extrusion process such as depicted in FIGS. 7, 9 and 12-13. The extruded material (such as 144) will normally be in an uncured state such as an uncured elastomeric material. The extrusion process further imparts a desired level of curvilinearity to the extruded material 144 as it exits the extrusion process, assuring an orthogonal mating seam (148, FIG. 8).

When an interior stiffening material is desired, the extruded material is supplied with an extruded central cavity, such as 150 in FIG. 7 or 172 in FIG. 9. In such case a slit can be formed at slitting step 204 in the extruded material. This can be carried out by a separate slitting operation, or by extruding the slit into the extruded material 144 (FIG. 13). Where employed, stiffening material can be inserted at a curing step 206 or at a stiffening step 208 described hereafter.

The extruded material is cured in a suitable curing operation at curing step 206, which preferably involves placing the material in a molding cavity and subjecting the material to appropriate pressure and temperature conditions for a suitable dwell time associated with the material to effect the appropriate curing. Other arrangements, such as curing ovens, can also be used, as desired.

When an internal stiffening material is desired, the stiffening step 208 following curing will involve filling the internal cavity (150 or 172) with the selected material, and curing same as required. At application step 210, the cured sealing member, following completion of the molding operation, can be used in an appropriate application to effect a fluid seal, such as in the valve member 100 depicted in FIGS. 2A and 2B. The process is completed at an end step 212.

For purposes of the appended claims, the recited first means will be understood to correspond to the afore described sealing members that achieve enhanced hoop strength, namely the elongated circle cross-sectional shaped sealing member 112 of FIGS. 2A-2B and 3-5; the elongated circle cross-sectional shaped sealing member 132 with an associated internally disposed stiffening material core 134 of FIG. 6; and the extruded sealing members with respective circular and rounded rectangle cross-sectional shapes and interiorly placed stiffening material of FIGS. 10-11. Prior art conventional O-rings as discussed in FIGS. 1A-1B, and prior art reinforced O-rings with molded in place reinforcement rings as disclosed by the aforementioned '299 patent process, are not included within the scope of the recited first means and are explicitly excluded from the definition of an equivalent.

Moreover, for purposes of the appended claims the term "elongated circle" will be understood to correspond to the shape as set forth in FIG. 5 in which a circle is linearly extended in a single direction (i.e., opposing 180 degree semicircular segments separated by linear line segments), and will thus exclude continuously curvilinear shapes such as ellipses and ovals, as well as segmented shapes such as a rounded rectangle.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A valve assembly, comprising:
   a valve seat;
   a piston movable with respect to said valve seat between a closed position and an open position, pressurized fluid flow being inhibited in the closed position and pressurized fluid flow being established in the open position; and
   means for establishing a fluid-tight seal when the piston is in the closed position and for preventing a blow out condition when the piston is transitioned to the open position, said means comprising an annular sealing member characterized as an O-ring with an elongated circle cross-sectional shape while the sealing member is in an uncompressed state, the cross-sectional shape taken along a plane including a central axis of the sealing member and defined by opposing inner and outer semicircular end surface segments of a selected radius R, and opposing top and bottom linear surface segments there between of a selected length L, L being equal to or greater than five times R, the outer semicircular end surface segment slidingly engaging a cylindrical surface of the valve seat as the piston moves from the closed position to the open position.

2. The valve assembly of claim 1, wherein the sealing member comprises an elastomeric material and a stiffening material disposed within an annular interior cavity of the elastomeric material.

3. The valve assembly of claim 1 further comprising a valve housing in which the valve seat, the piston and the first means are disposed, the valve housing forming a central passageway with an inlet port upstream of the valve seat and an outlet port downstream of the valve seat, the piston transitioning from said closed position to said open position responsive to a pressure of fluid at the inlet port reaching a predetermined threshold, said transitioning of the piston to the open position forming a bypass path for the pressurized fluid through the outlet port as the outer semicircular end surface segment disengages the cylindrical surface of the valve seat.

4. An apparatus comprising:
   a piston moveable between a closed position and an open position; and
   a sealing member disposed within an annular recess of the piston and characterized as an endless annular ring extending about a central axis of the piston, the sealing member having an elongated circle cross-sectional shape when the sealing member is in an uncompressed state prior to installation in said recess, the cross-sectional shape defined by parallel top and bottom surfaces having a length L in a direction perpendicular to and intersecting the central axis, and having opposing inner and outer surfaces of a radius R, the inner and outer surfaces respectively facing toward and facing away from the central axis, wherein the dimensional value of L is at least five times greater than the dimensional value of R, wherein the outer semicircular end surface segment contactingly engages a cylindrical valve seat surface to establish a fluidic seal in the closed position, wherein the outer semicircular end surface segment disengages the cylindrical valve seat surface in the open position, and the outer semicircular end surface segment slidingly moves in contact with the cylindrical valve seat as the piston transitions between the closed and open positions.

5. The apparatus of claim 4, further comprising a valve housing in which the piston and the sealing member are disposed, the valve housing forming a central passageway with an inlet port upstream of the piston and an outlet port downstream of the piston, the piston transitioning from said closed position to said open position responsive to a pressure of fluid at the inlet port reaching a predetermined threshold, said transition to the open position forming a bypass path for the pressurized fluid through the outlet port.

6. The apparatus of claim 4, wherein the sealing member is formed of a contiguous elastomeric material without a stiffening material of a different second material disposed therein.

7. The apparatus of claim 4, wherein the sealing member is formed of a contiguous elastomeric material with a stiffening filler material embedded therein to enhance a hoop strength of said material.

8. The apparatus of claim 4, further comprising a spring that exerts a bias force upon the piston to induce contacting engagement of both the piston and the sealing member against a valve seat member.

9. The apparatus of claim 4, wherein the piston comprises a piston body and a cover plate which is secured to the piston body by a fastener which extends through the cover plate and into the piston body, the sealing member contactingly compressed between said piston body and said cover plate.

10. The apparatus of claim 9, wherein the piston moves along a central piston axis between the closed and open positions, and the fastener is axially aligned with said central piston axis.

11. The apparatus of claim 4, further comprising a valve seat with a cylindrical inner sidewall against which the sealing member contactingly advances as the piston initiates movement between the closed and open positions.

12. The apparatus of claim 11, wherein the piston comprises an annular projecting flange which surrounds and extends outwardly from a central body of the piston, the annular projecting flange contactingly engaging a top surface of the valve seat to serve as a limit stop to prevent further movement of the piston in a direction toward the closed position.

13. A bypass valve assembly, comprising:
a valve housing that forms an interior conduit from an inlet port to an outlet port;
a valve seat disposed in said interior conduit, the valve seat comprising a central aperture aligned with said interior conduit and formed from a cylindrical inner sidewall;
a piston assembly adapted to selectively move between a closed position and an open position with respect to the valve seat, the piston assembly comprising a piston body which mechanically engages a limit surface of the valve seat and an annular sealing member compressed within an annular recess of the piston body, the annular sealing member contactingly wiping the cylindrical inner sidewall as the piston assembly moves toward the open position, the annular sealing member characterized as an endless annular ring extending about a central axis of the piston, the sealing member having an elongated circle cross-sectional shape when the sealing member is in an uncompressed state prior to installation in said recess, the cross-sectional shape defined by parallel top and bottom surfaces having a length L in a direction perpendicular to and intersecting the central axis, and having opposing inner and outer surfaces of a radius R, the inner and outer surfaces respectively facing toward and facing away from the central axis, and wherein the dimensional value of L is at least five times greater than the dimensional value of R.

14. The bypass valve assembly of claim 13, in which the sealing member is formed of contiguous elastomeric material without a stiffener member core therein.

15. The bypass valve assembly of claim 13, in which the sealing member is disposed within the annular recess of the piston body so that an outermost semicircular end surface of the sealing member contactingly engages the valve seat inner annular sidewall to effect a first fluidic seal, and an innermost semicircular end surface of the sealing member contactingly engages a base surface of the annular recess to effect a second fluidic seal, wherein said elongated circle cross-sectional shape of the sealing member facilitates retention of the sealing member within the annular recess as the piston assembly transitions to the open position.

16. The bypass valve assembly of claim 13, wherein the piston assembly further comprises a cover plate which is secured to the piston body by a fastener which extends through the cover plate and into the piston body, the sealing member contactingly compressed between said piston body and said cover plate.

17. The bypass valve assembly of claim 13, further comprising a biasing member which applies a biasing force to the piston assembly to maintain the piston assembly in said closed position, wherein pressurized fluid at said inlet port exerts a force upon the piston assembly to transition the piston assembly from the closed position to the open position to establish a bypass path for the fluid to the outlet port.

18. A valve assembly, comprising:
a valve seat;
a piston movable with respect to said valve seat between a closed position and an open position; and
an annular sealing member nested within in an annular groove in the piston to sealingly engage the valve seat in the closed position and to disengage from the valve seat in the open position, the annular sealing member formed of a contiguous elastomeric material without a stiffening material of a different second material disposed therein and having an elongated circle cross-sectional shape while the sealing member is in an uncompressed state, the annular sealing member having opposing top and bottom flat surfaces of length L and opposing inner and outer curvilinear surfaces at a selected radius R, wherein L is greater than, or equal to, five times R, and wherein the inner curvilinear surface establishes a first fluidic seal against an innermost wall surface of the annular groove, the top and bottom flat surfaces compressed against opposing side wall surfaces of the annular groove, and the outer curvilinear surface extending from the annular groove to contactingly engage the valve seat to establish a second fluidic seal thereagainst responsive to the piston being in the closed position.

19. The valve assembly of claim 18, in which the elongated circle cross-sectional shape is structurally configured to resist dislocation of the annular sealing member from the annular groove in a blow out condition as the piston transitions to the open position and the annular sealing member is moved away from the valve seat responsive to an increase in fluidic pressure exerted upon the piston.

20. The valve assembly of claim 18, in which the annular sealing member moves in a wiping action along a cylindrical surface of the valve seat to maintain a fluidic seal thereagainst as the piston advances from the closed position toward the open position.

21. The valve assembly of claim 18, in which the elastomeric material is a fluoroelastomer with a durometer of about 70-80.

* * * * *